June 1, 1937. J. H. CHEAVENS 2,082,149
REAGENT FEEDER
Filed Nov. 13, 1935
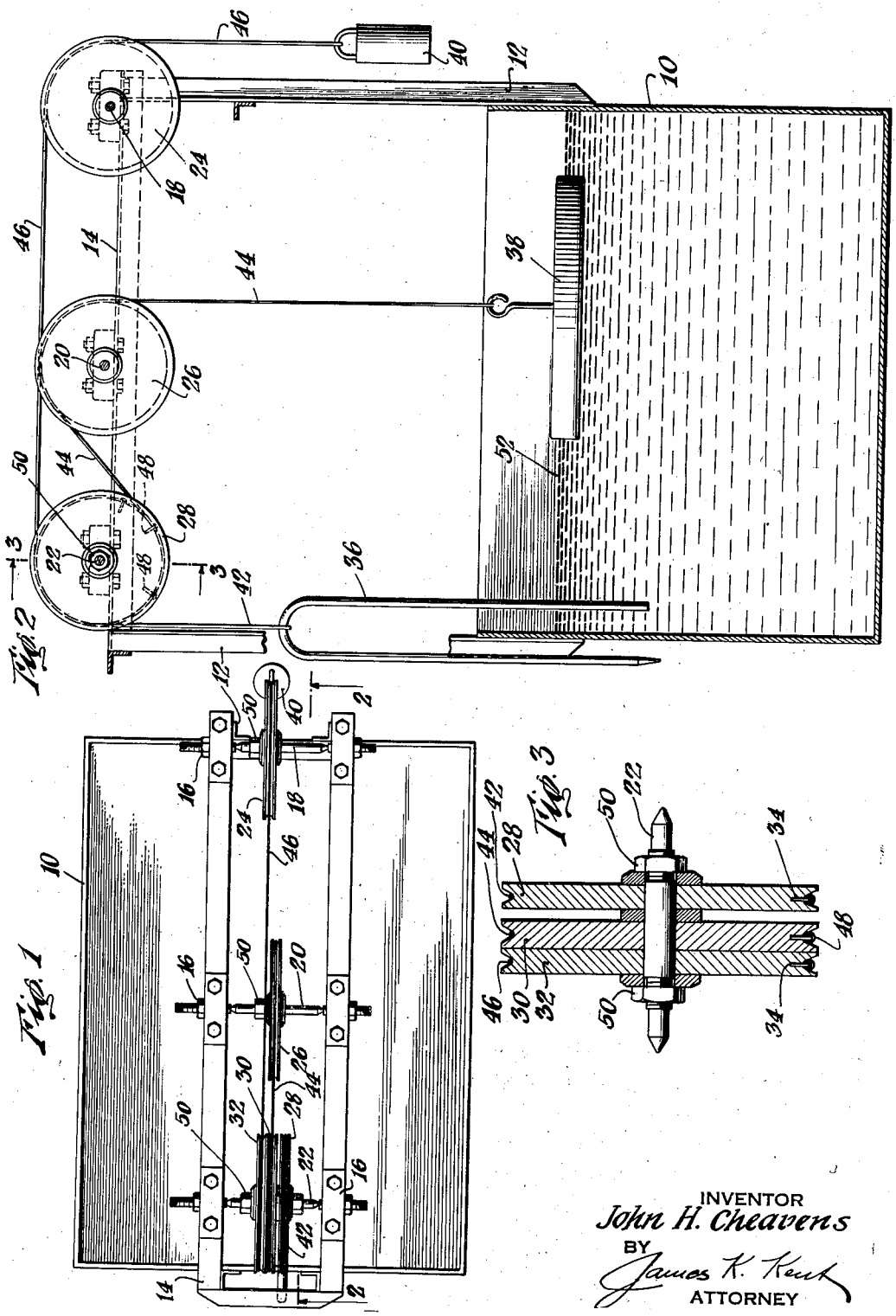
INVENTOR
John H. Cheavens
BY
James K. Kent
ATTORNEY Patented June 1, 1937

2,082,149

UNITED STATES PATENT OFFICE 2,082,149

REAGENT FEEDER

John H. Cheavens, Samne, Peru, assignor to American Smelting and Refining Company, New York, N. Y., a corporation of New Jersey Application November 13, 1935, Serial No. 49,521

5 Claims. (Cl. 210—18)

This invention relates to feeders for liquids.

Among other features, the invention provides a feeder capable of automatically and constantly delivering a reagent at a desired and predetermined rate of flow.

Various other features and advantages of the invention will be apparent from the following particular description and from an inspection of the accompanying drawing, the latter illustrating one form of a device embodying the invention, in which—

Fig. 1 is a plan view of a feeder in accordance with the invention,

Fig. 2 is a cross-section taken along the line 2—2 of Fig. 1, and

Fig. 3 is a section taken along the line 3—3 of Fig. 2.

Referring to the drawing, there is shown a tank 10 with uprights 12 supporting frame 14. Bearings 16 affixed to frame 14 carry the shafts 18, 20 and 22 on which are mounted sheaves 24, 26 and 28, 30, 32, respectively, the three sheaves last mentioned being provided in their peripheries with holes 34. A siphon 36, float 38 and counterweight 40 are connected respectively to sheaves 28, 30 and 32 by cords or lines 42, 44 and 46 by pins 48 engaging the holes 34. Nuts 50 permit ready adjustment of any of the sheaves on their respective shafts.

To operate the feeder, the tank 10 is filled with reagent to a proper level such as is indicated at 52 and the siphon tube 36 filled to initiate flow of the reagent through it. The rate of flow desired is obtained by raising or lowering the siphon by suitable manipulation of sheave 28 with respect to sheaves 30 and 32 and when once adjusted to the desired flow the three sheaves are secured by the appropriate lock nut.

Once the desired flow is set, it is maintained automatically by the float arrangement regardless of the level of the reagent in the tank. This is accomplished by the float, in its downward movement, maintaining the immersed portion of siphon tube 36 (which is balanced by counterweight 40) at exactly the same depth in the reagent at all times by counter-clockwise movement of the sheave 30 which has previously been adjusted in fixed relationship to sheaves 28 and 32.

In building feeders in accordance with the invention, the size will, of course, depend upon particular requirements. The siphon tube is ordinarily of glass and the tank of material not attacked by the liquid being fed. It may also be mentioned that the bearings carrying the shafts and their respective sheaves are adjusted so that all the sheaves turn freely in operation.

One of the chief advantages accompanying the use of the present invention is the extremely accurate feeding which is obtained, it having been found in ore flotation practise, for example, that decidedly more concentrated solutions may be successfully employed than is possible when using any other type of feeder commonly used in that art.

Again, the feeder is corrosionproof in that no moving parts which might be subject to attack by the solution are in contact therewith. Further, troubles from dust and sediment are eliminated as the outlet of liquid from the tank is at the top rather than the bottom.

While certain novel features of the invention have been disclosed and are pointed out in the annexed claims, it will be understood that various omissions, substitutions and changes may be made by those skilled in the art without departing from the spirit of the invention.

What is claimed is:

1. A feeder for liquids comprising a tank, a siphon for withdrawing liquid from said tank, a float in said tank and means associated with said siphon and said float for constantly maintaining the inlet of said siphon a predetermined distance below the level of liquid in said tank as the level of the liquid therein recedes.

2. Apparatus for feeding a liquid reagent at a constant rate comprising a tank, a float, a siphon and counterweight therefor and means whereby said float as it is lowered by withdrawal of liquid through said siphon maintains the inlet of said siphon a constant, predetermined distance below the surface of the liquid reagent in said tank.

3. Apparatus for feeding a liquid at a constant rate of flow comprising a tank, uprights supporting a frame above said tank, three sheaves carried on a single shaft mounted on said frame, cables connecting said sheaves respectively with a counterweight, a float and a siphon tube having its inlet extending into said tank, and means for adjusting each of said sheaves with respect to the others on said shaft.

4. Apparatus of the class described comprising a frame carrying five sheaves above a tank, two of said sheaves being mounted on individual shafts and the remaining three being mounted on a single shaft, an inverted U-tube associated with one of said three sheaves, a float associated with another of said three sheaves and one of the individual sheaves, a counterweight associated with the other of said three sheaves and the remaining individual sheave, the U-tube, float and counterweight being so coactively associated with the several sheaves that upon movement of the float downwardly the U-tube is lowered a corresponding distance while the movement of the counterweight is upwardly, and means for adjusting the three sheaves on the single shaft with respect to each other.

5. A reagent feeder comprising a tank adapted to contain the reagent, an inverted U-tube for siphoning reagent from said tank, a float within said tank and means whereby said float maintains one end of said inverted U-tube at a predetermined position with respect to the surface of the reagent in said tank regardless of the level of said reagent.

JOHN H. CHEAVENS.